United States Patent Office

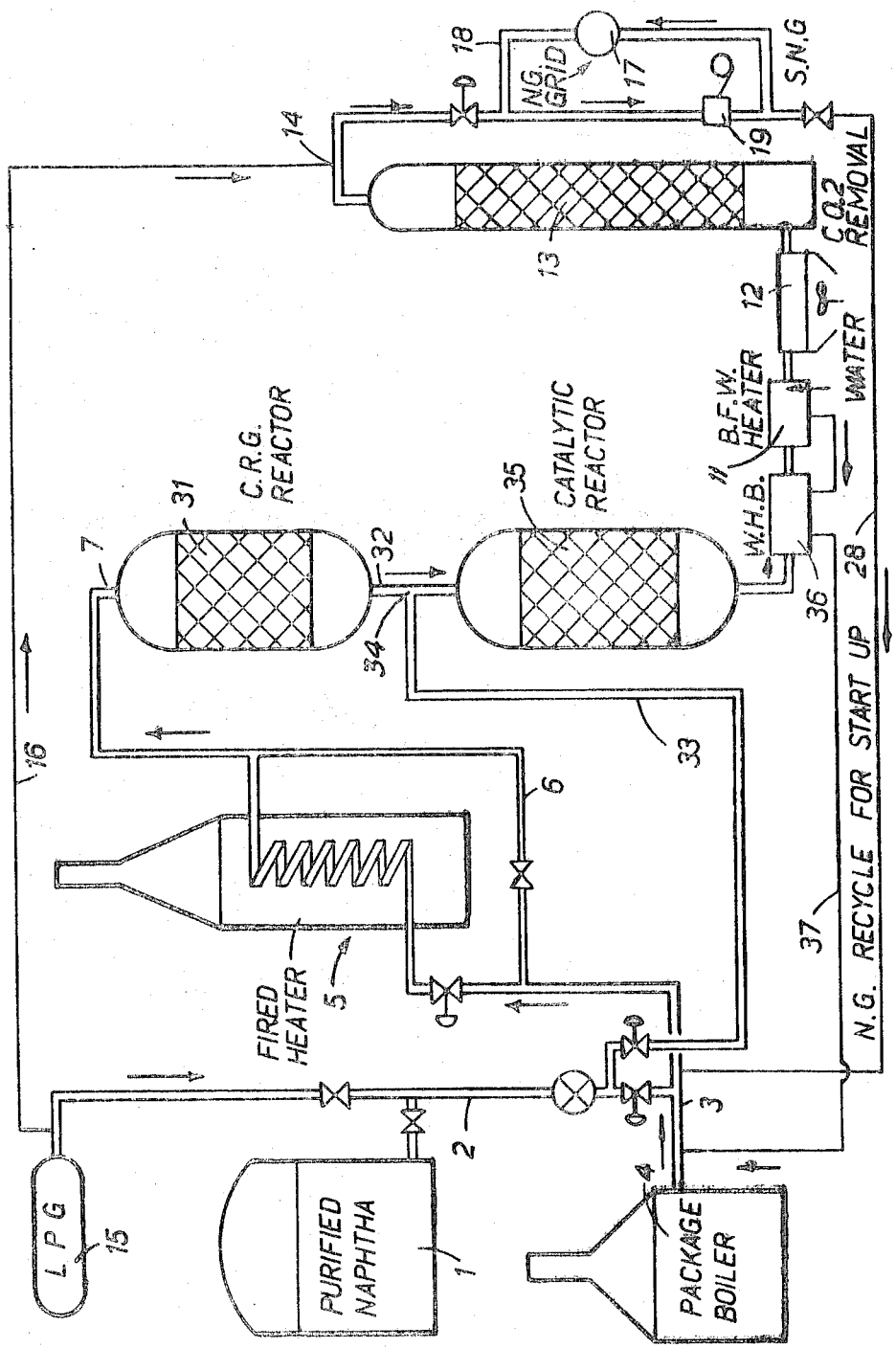

3,625,665
Patented Dec. 7, 1971

3,625,665
PROCESS FOR THE PRODUCTION OF METHANE CONTAINING GASES
Brian Hoyle Thompson, Solihull, England, assignor to The Gas Council, London, England
Filed Apr. 23, 1969, Ser. No. 818,561
Int. Cl. C07c 9/04
U.S. Cl. 48—214                                13 Claims

---

ABSTRACT OF THE DISCLOSURE

A process for the production of a gas containing a high proportion of methane (e.g. 90% or more) comprises: (i) introducing a preheated mixture of steam and the vapour of a predominantly paraffinic hydrocarbon feedstock having a final boiling point of not more than 300° C. (e.g. naphtha) into a first catalytic reaction zone in which the mixture reacts in the presence of a steam reforming catalyst to give a gas containing methane, hydrogen, carbon oxides and undecomposed steam; (ii) cooling the gas produced in stage (i) by adding a further quantity of at least one of the reactants; (iii) introducing the gaseous mixture formed in stage (ii) into a second catalytic reaction zone in which the constituents of the mixture react in the presence of a catalyst to increase the proportion of methane in the mixture; and (iv) removing steam and carbon dioxide from the gas leaving the second catalytic reaction zone. The gas may be used as a synthetic natural gas.

In both stages (i) and (iii) the temperature is kept as low as possible, depending on the catalyst: for example, stage (i) may be operated at a catalyst bed temperature of 400–500° C., and stage (iii) such that the outlet temperature is 200–250° C., when a low temperature steam reforming catalyst is used in both stages. The reaction zone in stage (iii) may be internally cooled, at least at the outlet end of the zone.

The cooling in stage (ii) is preferably achieved by adding cold hydrocarbon feedstock.

---

This invention relates to a process for making a gas containing a high proportion of methane, in particular, a gas consisting substantially of methane, (so that it is similar to or interchangeable with natural gas and can be introduced into a natural gas transmission system), by catalytic enrichment of the methane-containing gas produced by the gasification of light petroleum oils (for instance, light petroleum distillate) in steam. Several processes are known which employ these gasification reactions, operating at various temperatures and pressures and producing gases containing varying proportions of methane. As is well known, the high-temperature processes, operating at, say, 750° C., produce gases containing less methane (under similar conditions of pressure and proportions of supply of reactants) than the low-temperature processes, operating at, say 450–550° C.

It is preferred to choose for the production of the gas to be catalytically enriched a process which results in a gas already containing a high proportion of methane. Such a process, for the low temperature gasification of light hydrocarbons (for instance, light petroleum distillate or naphtha), is described and claimed in commonly owned British patent specification No. 820,257. The process comprises passing a mixture of predominantly paraffinic hydrocarbons and steam in vapour form at a temperature above 350° C. through a bed of a nickel catalyst under atmospheric or superatmospheric pressure such that the bed is maintained by the reaction at temperatures within the range of 400° C. to 550° C.

The catalyst employed may be a nickel-alumina catalyst formed by co-precipitation of nickel and aluminium salts followed by reduction of the nickel in the mixture to the metallic state, to which catalyst is added a minor proportion of an oxide, hydroxide or carbonate of an alkali or alkaline earth metal. The preheat temperature of the reactant mixture may be as high as 600° C., in which case the catalyst bed temperature may rise above 550° C. (for example, towards 600° C.). Methods are known for increasing the life of the catalyst by increasing the proportion of steam and hydrogen in contact with it.

The resulting gases contain steam, hydrogen, carbon oxides (more $CO_2$ than $CO$) and a substantial proportion of methane. This proportion may be increased by methanation at a lower temperature. Thus, the methane-rich gas produced by the process of the above mentioned British specification No. 820,257 may be subjected to the action of a nickel catalyst at a lower temperature, for example, at 400° C. or below, to bring about the formation of methane by reaction between carbon dioxide, carbon monoxide and hydrogen present in the gas.

The present invention relates to a particular process for performing the steps thus described, aimed especially at the production of gas consisting (after removal of steam and carbon dioxide) substantially wholly of methane.

The invention provides a process for the production of a gas containing a high proportion of methane, which process comprises (i) introducing a preheated mixture of steam and the vapour of a predominantly paraffinic hydrocarbon feedstock having a final boiling point of not more than 300° C. into a first catalytic reaction zone in which the mixture reacts in the presence of a steam reforming catalyst to give a gas containing methane, hydrogen, carbon oxides and undecomposed steam; (ii) cooling the gas produced in stage (i) by adding a further quantity of at least one of the reactants; (iii) introducing the gaseous mixture formed in stage (ii) into a second catalytic reaction zone in which the constituents of the mixture react in the presence of a catalyst to increase the proportion of methane in the mixture; and (iv) removing steam and optionally carbon dioxide from the gas leaving the second catalytic reaction zone.

By a high proportion of methane is meant a high proportion calculated on the dry carbon dioxide-free basis.

The gas removed from the second catalytic reaction zone is cooled so that the undecomposed steam condenses and can be removed. A high proportion of the carbon dioxide content of the product gas is then preferably removed, leaving a gas containing a high proportion of methane, together with residual hydrogen and carbon dioxide. If the final synthesised gas is to be introduced into a transmission line conveying natural gas, which natural gas is of significantly different composition and combustion properties from the synthesised gas (for instance, by virtue of containing higher hydrocarbons), it may be desirable to add light petroleum gas (L.P.G.) to the synthesised gas before introducing it into the transmission line, so as to make it completely interchangeable with the natural gas.

The final product gas will usually contain at least 85%, and preferably 90%, by volume of methane on the dry carbon dioxide-free basis.

The steam reforming processes that may be operated within the first catalytic reaction zone are well-known, as are the catalysts that may be used for them.

For instance, the process may be that of steam-reforming naphtha at high temperatures, within the range 700 to 800° C., at pressures up to 25 to 30 atmospheres, in externally-fired tubular reformers, over a catalyst which may comprise nickel, a refractory support, and a promoter such as a compound of an alkali metal, incorporated into a composition with a hydraulic binding agent. The gas produced may contain, when dried, for example, some 70% of hydrogen, 10% of methane, and 20% of carbon oxides. Operations may also be conducted at lower temperatures, such as 600 to 700° C., with the production of gas richer in methane.

But, since, in this zone, the lower the temperature at which the reaction is carried out the higher is the methane content of the product gas, the reaction is preferably carried out at the lowest temperature at which the reaction can be initiated on the catalyst consistent with the feedstock being fully vaporised. For example, the catalyst may be a coprecipitated nickel-alumina catalyst containing an alkali metal or alkaline earth metal, examples of which are described in commonly owned British specification Nos. 969,637 and 1,150,066. Alternatively, catalysts containing a high proportion of an alkaline earth metal (especially barium), for instance, as described in commonly owned U.S. Patent No. 3,515,527 may be used, but they are not preferred. With these co-precitated catalysts, the catalyst bed temperature is generally in the range 400–550° C., preferably 400–500° C.

Before being introduced into the first catalytic reaction zone, the mixture of feedstock vapour and steam has to be preheated to a temperature which, in combination with the catalyst bed temperature, enables the reaction to proceed. In general, the mixture of feedstock vapour and steam should be preheated to a temperature which is no higher than is necessary for the maintenance of the hydrocarbon in the completely vaporised state and for the initiation of the reactions on the catalyst. With typical catalysts known for the low-temperature gasification of hydrocarbons in steam, as indicated hereinbefore, such a temperature is 400° C. or above. It should not be necessary for the temperature to exceed 500° C. and preferably it will be below 450° C.

In order to avoid the deposition of carbon on the steam-reforming catalyst (under the above-described low temperature conditions), it is necessary for the proportion of steam relative to the hydrocarbons to be greater than that which enters into reaction. The excess of steam required for this purpose depends on the average molecular weight of the hydrocarbons used. However, the excess is not great, and two parts by weight of steam to one part by weight of hydrocarbons can be used with all mixtures of hydrocarbons containing an average of 4 to 10 carbon atoms per molecule; a larger proportion, up to 5 parts by weight of steam to one part by weight of hydrocarbons, may be used if desired. In the case of hydrocarbons containing an average of 4 to 7 carbon atoms, the proportion of steam may be as low as 1.5 parts by weight.

Either of the reactants, the paraffinic hydrocarbon feedstock or water, or both together, may be added to the product gas removed from the first catalytic reaction zone in order to cool it. Preferably, the paraffinic hydrocarbon feedstock is added, accompanied if desired by water or steam. These materials may be used in any form, for example, as the cold liquid, provided always that the mixture of first-stage product gas and reactant is wholly in the vapour state when the cooling operation is complete. It may be preferable to add the reactant or reactants as liquid to enable the latent heat of evaporation to be absorbed.

If desired, the stage (i) product gas may be cooled by conventional means, for example, by the use of a heat-exchanger, before the cooling reactant is admixed with it. The mixture of stage (i) product gas and reactant may also be cooled in a similar way, but this is not preferred.

It is advisable to ensure by positve steps that the fresh reactant is completely evaporated, if added as liquid, and that its vapour is well mixed with the first-stage product gas before the mixture reaches the catalyst in the second reaction zone. Thus, for example, a layer of non-catalytic material, such as a refractory substance in the form of large granules or spheres, may be placed above the catalyst in the second reaction zone, to provide a surface from which deposited material may be evaporated and a labyrinthine path in which mixing may be completed.

Different types of reaction occur simultaneously in the second catalytic reaction zone. Where fresh light petroleum oil is added, it undergoes gasification reactions with the steam and hydrogenation reactions with the hydrogren present in the stage (i) product gases, and each class of reaction produces methane. In addition, methane is synthesised from the hydrogen and carbon oxides produced by the gasification reactions occurring in either stage.

Each of these classes of reaction is exothermic, but methane production is maximised by operation at the lowest possible temperature. The cooling of the reactants preferably to a temperature no higher than that necessary for the initiation of the reactions when the reactants reach the catalyst, is thus an important means of attaining the desired objective, since, then, the liberation of heat by the reactions only raises the products to a temperature at which a high concentration of methane is still obtained. The inlet temperature of the gases entering the second stage catalyst is generally within the range 300–400° C.

Active catalysts that are suitable for the gasification and hydrogenation reactions, such as the low temperature steam reforming catalysts referred to above, are also suitable for the methanation reactions and indeed are capable of maximising the methane concentration by bringing the reaction mixture to equilibrium at the temperatures that are attained in the process so far described.

Indeed, such catalysts are capable of bringing the reactants to equilibrium at a considerably lower temperature than that which results from the heating of the reaction mixture above the minimum initial temperature by the exothermicity of the reactions and this enables the concentration of methane in the final product gas to be still further increased, if desired, by internal cooling of the catalyst bed. For example, water (that may have been used to cool the product gases leaving the second catalytic reaction zone) may be passed through an internal heat-exchanger in the second catalytic reaction zone, to cool the catalyst bed. The internal heat-exchanger may act as a boiler, so that steam is produced, and all or part of the steam leaving the internal heat-exchanger may then be used as process (reactant) steam.

It may be advantageous, especially when the reactions in the second catalytic reaction zone are initiated at a comparatively low temperature, so to arrange an internal cooler that only the outlet end of the catalyst bed is cooled. This enables the reactions to be started at the temperature of the inlet mixture without risk of their being quenched by unduly early cooling, and so can ensure that a high proportion, preferably substantially all, of the feedstock added at the inlet of the second zone is decomposed before the mixture reaches the cooled portion of the zone. Then the predominating, or substantially only, reactions proceeding in the cooled zone are the synthesis of methane from carbon oxides and hydrogen, and this can reach equilibrium at a low temperature, for instance 200 to 250° C.

The feedstock is preferably one which has an initial boiling point at atmospheric pressure of not less than 30° C. and a final boiling point of not more than 200° C., preferably not more than 150° C. The preferred feedstock is naphtha.

Before the feedstock can be used in the process of the invention, it has to be purified with respect to sulphur to avoid catalyst poisoning. This may be effected by a hydrodesulphurisation process. A hydrogen-containing gas for use in a hydrodesulphurisation process may be withdrawn from between the first and second catalytic reactor. If a conventional purification process is used, it is desirable to remove at least some of the carbon dioxide present in this gas before it can be used in the hydrodesulphurisation process; but the gas is suitable for direct use in the purification process of commonly owned U.S. patent application, Ser. No. 809,016, filed Mar. 20, 1969, in the name of John Aldwyn Lacey, and entitled "Purification of Hydrocarbon Oils." Whether or not it is desired to make this provision for removal of a hydrogen-containing gas, the two catalytic reactors can be combined into a single pressure vessel.

The catalyst beds in both instances may either be static or fluidised.

The pressures at which the process of the invention can be carried out are well known. The pressure is preferably above atmospheric pressure, for example within the range 5 to 100 atmospheres or higher. A convenient pressure to work at is above 70 atmospheres, so that the final product gas can be directly admitted to a natural gas transmission system.

The higher the working pressure, above, say, 25 to 30 atmospheres, the less is it desirable to use in stage (i) processes which employ externally-heated catalyst vessels, such as reformer tubes, especially those operating at high temperatures, in view of the severity of the duty imposed on the alloy from which the vessels or tubes are constructed.

The process of the invention will be illustrated with reference to the accompanying drawing, which is a flow diagram of a self-contained plant for making substitute natural gas and feeding it into a high pressure transmission grid.

In the drawing, purified naphtha, either as liquid or vapour, is made available at 1 and is supplied via pipe 2 to point 3 where it meets a stream of steam supplied from 4, which can be the outlet of a packaged boiler. If the naphtha is supplied as liquid it evaporates in the stream of steam and if necessary the evaporation may be completed in the heater 5, which also serves to preheat at least part of the mixture. The by-pass 6 enables the mixture of naphtha vapour and steam to be delivered to the inlet 7 of the first catalytic reactor 31 at the chosen temperature, which is preferably the lowest (consistently with the naphtha being fully vaporized) at which reaction can be initiated on the catalyst.

In reactor 31 the naphtha is completely converted to gas so that there emerges from the outlet 32 a mixture of hydrogen, carbon monoxide and dioxide, methane and steam which is normally at equilibrium at the temperature of the outlet of the catalyst. The operation of the reactor 31 is adiabatic, there being no provision for internal cooling. A further supply of reactant or reactants is added at 34; it, or they, may be liquid so that the latent heat of evaporation may be absorbed from the gases leaving reactor 31. Thus, liquid naphtha may be introduced along pipe 33 to junction 34. Alternatively, pipework may be provided to enable distillate vapour and water to be introduced at the junction 34.

The mixture of gases then passes into a second reactor 35, in which steam reforming, hydrogenation and methanation reactions proceed. These reactions result in the production of a mixture consisting of methane, hydrogen, carbon oxides and undecomposed steam at equilibrium at the temperature of the catalyst outlet. The gas leaving the reactor 35 is then cooled in a waste-heat boiler 36 and the heat exchanger 11 and the fanned cooler 12. Condensate is removed in the cooler 12 by a drain, not shown, and carbon dioxide is removed by any convenient known means in the tower 13.

The steam raised in the heat exchanger 11 and in the boiler 36 passes along a pipe 37 to the inlet steam supply 4.

If necessary, the composition, calorific value and Wobbe index of the final gas can be adjusted, by the addition of LPG at 14 from the source 15 via pipe 16 before it is admitted to the natural gas grid 17, either directly via 18 or with the aid of compressor 19.

For starting up the process, natural gas may be recycled along 28.

EXAMPLE 1

The following data were obtained using the plant described above.

| Condition number | 1 | 2 | 3 | 4 | | | | |
|---|---|---|---|---|---|---|---|---|
| Pressure, atmospheres | 25 | | 25 | | 70 | | 70 | |
| Naphtha characterisation | (1) | | (1) | | (1) | | (1) | |
| Steam/naphtha ratio at inlet first reactor, lb. per pb. supplied | 2 | | 2 | | 2 | | 2 | |
| Temperature at inlet first reactor, °C | 450 | | 450 | | 400 | | 400 | |
| Temperature at outlet first reactor, °C | 499 | | 499 | | 472 | | 472 | |
| Proportion of cold naphtha added at inlet second reactor lb./lb. supplied at inlet first reactor | 1.0 | | 0.429 | | 1.0 | | 0.429 | |
| Overall steam/naphtha ratio, lb. per lb | 1.0 | | 1.4 | | 1.0 | | 1.4 | |
| Temperature at inlet second reactor, °C | (a) | (b) | (a) | (b) | (a) | (b) | (a) | (b) |
| (a) Cooled only by added reactant | 366 | | 422 | | 339 | | 414 | |
| (b) With additional cooling to | | 300 | | 300 | | 300 | | 300 |
| Temperature at outlet second reactor, operated without internal cooling, °C | 466 | 435 | 483 | 404 | 454 | 423 | 472 | 385 |
| Composition of wet gas leaving second reactor (methanator), percent by volume: | | | | | | | | |
| $CO_2$ | 17.1 | 17.1 | 14.3 | 14.0 | 17.0 | 16.9 | 14.0 | 13.8 |
| CO | 0.5 | 0.3 | 0.45 | 0.1 | 0.2 | 0.1 | 0.2 | 0.0 |
| $H_2$ | 4.3 | 3.2 | 6.3 | 2.8 | 2.4 | 1.7 | 3.5 | 1.4 |
| $CH_4$ | 55.2 | 55.9 | 43.55 | 45.4 | 56.4 | 56.9 | 45.0 | 46.1 |
| $H_2O$ | 22.9 | 23.5 | 35.4 | 37.7 | 24.0 | 24.4 | 37.3 | 38.7 |
| Total | 100.0 | 100.0 | 100.0 | 100.0 | 100.0 | 100.0 | 100.0 | 100.0 |
| Properties of final gas, dry, after carbon dioxide removal (1 percent residual), before L.P.G. enrichment: composition, percent by volume: | | | | | | | | |
| $CO_2$ | 1.0 | 1.0 | 1.0 | 1.0 | 1.0 | 1.0 | 1.0 | 1.0 |
| CO | 0.8 | 0.45 | 0.9 | 0.2 | 0.4 | 0.2 | 0.4 | 0.1 |
| $H^2$ | 7.15 | 5.3 | 12.4 | 5.8 | 4.0 | 2.9 | 7.1 | 2.9 |
| $CH_4$ | 91.05 | 93.25 | 85.7 | 93.0 | 94.6 | 95.9 | 91.5 | 96.0 |
| Total | 100.0 | 100.0 | 100.0 | 100.0 | 100.0 | 100.0 | 100.0 | 100.0 |
| Calorific value, B.t.u./ft.³ | 928 | 943 | 893 | 941 | 953 | 961 | 931 | 962 |
| Specific gravity (air=1) | 0.529 | 0.536 | 0.504 | 0.533 | 0.542 | 0.547 | 0.527 | 0.546 |
| Wobbe Index | 1,276 | 1,288 | 1,258 | 1,289 | 1,295 | 1,299 | 1,282 | 1,302 |

1 L.D.F. 115.

EXAMPLE 2

In an experiment in which the catalyst used in both zones was co-precipitated nickel-alumina catalyst prepared generally as in British specification No. 969,637 containing approximately 75 percent of nickel (calculated as metal) and one percent of potassium (calculated as metal) which had been added as potassium carbonate (the percentages being of the total of the nickel, alumina and potassium in the catalyst), operating conditions and results were as follows:

| | |
|---|---|
| Pressure, atmospheres | 5 |
| Naphtha characterisation | L.D.F. 115 |
| Steam/naphtha ratio at inlet first reactor, lb. per lb. | 2 |
| Temperature at inlet first reactor, °C | 400 |
| Temperature at outlet first reactor, °C | 480 |
| Proportion of cold naphtha added at inlet second reactor, lb. per lb. supplied at inlet first reactor | 0.33 |
| Overall steam/naphtha ratio, lb. per lb. | 1.5 |
| Temperature at inlet second reactor, °C | 305 |
| Temperature at outlet second reactor, operated without internal cooling, °C | 386 |

Compositions of gases leaving second stage reactor, percent by volume:

|  | Wet | Dry | Dry and after carbon dioxide removal (1 percent residual) |
|---|---|---|---|
| $CO_2$ | 12.75 | 21.1 | 1.0 |
| CO | 0.25 | 0.45 | 0.55 |
| $H_2$ | 3.05 | 5.0 | 6.25 |
| $CH_4$ | 44.45 | 73.45 | 92.2 |
| $H_2O$ | 39.5 |  |  |
| Total | 100.0 | 100.0 | 100.0 |

Properties of final gas (dry, with 1 percent residual carbon dioxide):

Calorific value, B.t.u./ft.$^3$ _____ 936
Specific gravity (air=1) _____ 0.532
Wobbe Index _____ 1284

EXAMPLE 3

The catalyst used in both zones in the following experiments was as described in Example 2.

| Experiment Number | 1 | 2 | 3 |
|---|---|---|---|
| Pressure, atm | 24.7 | 24.7 | 24.7 |
| Naptha characterixation | (¹) | (¹) | (¹) |
| Specific gravity (60° F./60° F.) | 0.683 | 0.683 | 0.683 |
| Steam/naptha ratio at inlet first reactor, lb. per lb | 2.0 | 2.0 | 2.0 |
| Temperature at inlet first reactor, ° C | 401 | 401 | 401 |
| Temperature at outlet first reactor, ° C | 480 | 480 | 480 |
| Portion of cold naphtha added at inlet second reactor, lb. per lb. supplied at inlet first reactor | 0.352 | 0.503 | 0.752 |
| Overall steam/naphtha ratio, lb. per lb | 1.48 | 1.33 | 1.14 |
| Temperature at inlet second reactor ° C | 330 | 326 | 330 |
| Temperature at outlet second reactor, operated without internal cooling, ° C | 410 | 421 | 440 |
| Composition of wet gas leaving second reactor (methanator) percent by volume: | | | |
| $CO_2$ | 12.9 | 14.0 | 15.55 |
| CO | 0.1 | 0.15 | 0.1 |
| $H_2$ | 3.35 | 3.6 | 3.85 |
| $CH_4$ | 43.3 | 46.35 | 51.65 |
| $H_2O$ | 40.35 | 35.9 | 28.85 |
| Total | 100.0 | 100.0 | 100.0 |
| Properties of final gas, dry, after carbon dioxide removal (1 percent residual), before L.P.G. enrichment: composition, percent by volume: | | | |
| $CO_2$ | 1.0 | 1.0 | 1.0 |
| CO | 0.2 | 0.25 | 0.2 |
| $H_2$ | 7.15 | 7.1 | 6.9 |
| $CH_4$ | 91.65 | 91.65 | 91.9 |
| Total | 100.0 | 100.0 | 100.0 |
| Calorific value, B.t.u./cu. ft | 932 | 932 | 934 |
| Wobbe index, after enrichment to a calorific value of 1,000 B.t.u./cu. ft. with propane | 1,317 | 1,317 | 1,317 |

¹ LDF 115.

The designation "LDF" refers to the result of applying Method No. IPC 123/64, Institute of Petroleum, "Standard Methods of Test for the Distillation of Petroleum Products," to samples of light petroleum distillate. The method is a standard side-arm distillation and the temperature of the vapour is measured immediately before it enters the side-arm to reach the condenser. When a light petroleum distillate designated L.D.F. T° C. is submitted to this test, not less than 95% by volume of the initial distillate shall have been condensed and collected in the receiver when the temperature at the inlet to the side-arm has reached T° C. T° C. is generally a few degrees centigrade lower than the final boiling point as observed in the same test.

I claim:

1. A process for the production of a gas containing at least about 85% methane by volume on a dry, carbon dioxide-free basis, said process comprising:

contacting an inlet gaseous mixture of water and naphtha with a steam reforming catalyst in a first catalytic reaction zone;

maintaining the minimum temperature in said zone at a level of about 400° C. and the maximum temperature at a level of no greater than about 800° C. to produce an intermediate gas product containing at least about 10% methane by volume, on a dry basis, together with hydrogen, carbon oxides and residual water;

said intermediate gas product being cooled to a temperature within the range of from about 300° to about 400° C. by directly admixing with it a coolant which is at least partially naphtha, any other portion being water, and which coolant is at least partially liquid;

contacting the cooled gaseous mixture with a steam reforming catalyst in a second catalytic reaction zone at substantially lower temperatures than the temperatures in said first zone to produce a final product containing a greater percentage of methane than said intermediate gas product; and removing water from the final gas product.

2. A process as set forth in claim 1 wherein said coolant further comprises water.

3. A process as set forth in claim 2 wherein at least a portion of said water is in the liquid state.

4. A process as set forth in claim 2 wherein at least a portion of said water is in the gaseous state.

5. A process as set forth in claim 1 wherein at least a portion of the naphtha in said coolant is in the liquid state.

6. A process as set forth in claim 1 wherein the reaction temperature in said first zone is the lowest at which the reaction can be initiated on the catalyst consistent with the inlet gaseous mixture being fully vaporized.

7. A process as set forth in claim 1 wherein said intermediate gas product is partially cooled in a heat exchanger.

8. A process as set forth in claim 1 wherein said intermediate gas product is cooled to a temperature no greater than necessary for the initiation of the reactions in the second zone.

9. A process as set forth in claim 1 wherein the catalyst in said first zone is a co-precipitated nickel-alumina catalyst containing a member selected from the group consisting of the alkali metals and the alkaline earth metals.

10. A process as set forth in claim 9 wherein the inlet gaseous mixture is preheated to a temperature of 400° C. to 450° C.

11. A process as set forth in claim 9 wherein the second catalytic reaction zone is internally cooled.

12. A process as set forth in claim 11 wherein the second catalytic reaction zone is cooled by passing water through an internal heat exchanger which acts as a boiler, the steam produced in said boiler being utilized as the reactant steam in said inlet gaseous mixture.

13. A process as set forth in claim 11 wherein the outlet end of the second catalytic reaction zone is internally cooled to a temperature of 200° C. to 250° C.

References Cited

UNITED STATES PATENTS

| 2,738,262 | 3/1956 | Benz et al. | 48—213 X |
| 3,128,163 | 4/1964 | Weittenhiller et al. | 48—197 |
| 3,420,642 | 1/1969 | Percival | 48—214 |
| 3,450,514 | 6/1969 | Sinfelt et al. | 48—214 |
| 3,469,957 | 9/1969 | Percival et al. | 48—214 |
| 3,511,624 | 5/1970 | Humphries et al. | 48—214 X |

FOREIGN PATENTS

| 820,257 | 9/1959 | Great Britain | 48—214 |

JOSEPH SCOVRONEK, Primary Examiner

U.S. Cl. X.R.

48—197, 213; 260—449

UNITED STATES PATENT OFFICE
CERTIFICATE OF CORRECTION

PATENT NO. : 3,625,665
DATED : December 7, 1971
INVENTOR(S) : Brian Hoyle Thompson It is certified that error appears in the above-identified patent and that said Letters Patent are hereby corrected as shown below:

On the Title page of the patent, the following information should be added: --Foreign Application Priority Data May 3, 1968 Great Britain . . . 21146/68

Signed and Sealed this twenty-ninth Day of July 1975

[SEAL]

Attest:

RUTH C. MASON
Attesting Officer

C. MARSHALL DANN
Commissioner of Patents and Trademarks